J. H. COOK.

ROLLER BEARING.

APPLICATION FILED JULY 1, 1908.

932,760. Patented Aug. 31, 1909.

WITNESSES:
Eleanor Coakley
Justin A. Pallard

INVENTOR
John H. Cook

BY
Andrew Foulds Jr.
ATTORNEYS

UNITED STATES PATENT OFFICE.

JOHN H. COOK, OF BROOKLYN, NEW YORK.

ROLLER-BEARING.

932,760. Specification of Letters Patent. Patented Aug. 31, 1909.

Application filed July 1, 1908. Serial No. 441,279.

*To all whom it may concern:*

Be it known that I, John H. Cook, a citizen of the United States, and resident of the borough of Brooklyn, in the county of Kings and State of New York, have invented certain new and useful Improvements in Roller-Bearings, of which the following is a specification.

My invention relates to improvements in roller bearings for wheels and similar devices and the object of my invention is to provide a simple and convenient device for the purpose named.

My device is illustrated in the accompanying drawings in which—

Figure 1:
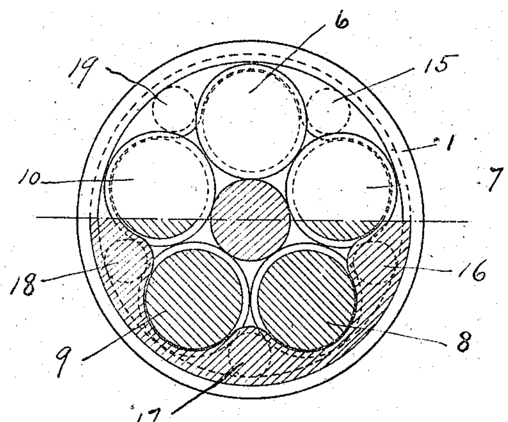
Figure 2:
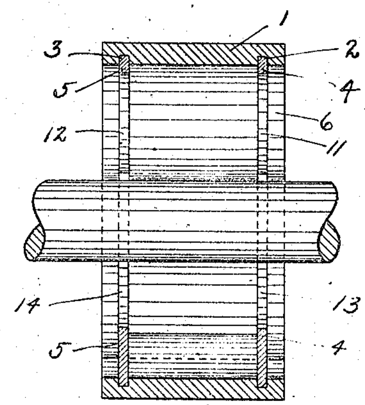
Figure 3:
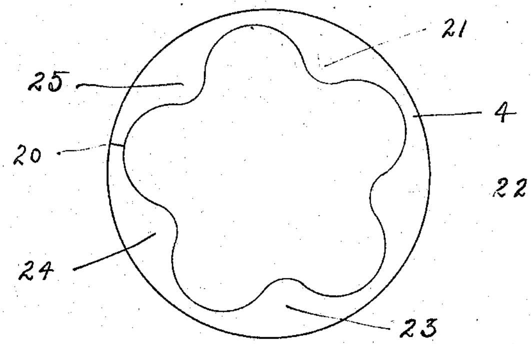

Figure 1 is an end view of the device, the lower half being shown in cross section. Fig. 2 is a vertical view of the device, parts being broken away, and Fig. 3 is a view of the washer.

Similar characters refer to similar parts throughout the several views.

Referring to the drawings, 1 represents a casing having a plurality of annular grooves 2 and 3 of which two are shown formed in its inner surface, to receive the split washers 4 and 5 respectively. A series of counterpart rollers 6, 7, 8, 9, and 10, provided with annular grooves 11, 12, 13 and 14 are placed within the casing 1 in such manner that its said annular grooves are engaged by the inner edge sections of the washers 4 and 5. A series of small counterpart rollers 15, 16, 17, 18 and 19 are also provided within the casing 1 and between the large rollers 6, 7, 8, 9, and 10 and the inner face of the said casing, and which small rollers are of suitable length to rest between the inwardly extending raised sections 21, 22, 23, 24 and 25 of the washers 4 and 5. I prefer to form my washers 4 and 5 of such size that they may be slipped into the casing from the end and being split at 20 in the usual well known manner, they will spring out into the annular grooves 2 and 3 respectively and will thus be retained in position.

Having thus described my invention what I claim is

In a device of the character described the combination of a casing provided with annular grooves in its inner surface, washers seated therein and provided with a plurality of inwardly extending raised sections, a plurality of rollers within the said casing each provided with annular grooves to receive the said washers and smaller rollers intermediate of the said washers and between the inner face of the casing and the large rollers, substantially as shown and described.

Signed at New York in the county of New York and State of New York this 19th day of June, A. D. 1908.

JOHN H. COOK.

Witnesses:

L. B. Meyer,

Z. B. Cook.